(12) United States Patent
Phillips et al.

(10) Patent No.: US 8,297,606 B2
(45) Date of Patent: Oct. 30, 2012

(54) CUTTING BOARD APPARATUS

(76) Inventors: Michael Stanley Phillips, Wyckoff, NJ (US); Angelo Vincent Polli, Franklin Lakes, NJ (US)

( * ) Notice: Subject to any disclaimer, the term of this patent is extended or adjusted under 35 U.S.C. 154(b) by 536 days.

(21) Appl. No.: 12/462,961

(22) Filed: Aug. 6, 2009

(65) Prior Publication Data

US 2011/0031672 A1    Feb. 10, 2011

(51) Int. Cl.
*B23Q 3/00* (2006.01)
(52) U.S. Cl. .................. 269/289 R; 269/302.1
(58) Field of Classification Search ............. 269/289 R, 269/302.1; 156/250, 267, 290, 308.4; 451/533, 451/538
See application file for complete search history.

(56) References Cited

U.S. PATENT DOCUMENTS

| | | | | |
|---|---|---|---|---|
| 816,683 | A * | 4/1906 | Keller | 269/302.1 |
| 2,830,305 | A * | 4/1958 | Freepons | 5/413 R |
| 3,170,178 | A * | 2/1965 | Scholl | 12/146 R |
| 3,196,869 | A * | 7/1965 | Scholl | 602/30 |
| 3,673,030 | A * | 6/1972 | Naulte et al. | 156/193 |
| 3,837,634 | A * | 9/1974 | Cobb | 269/289 R |
| 5,111,584 | A * | 5/1992 | Iero et al. | 30/489 |
| 6,019,359 | A * | 2/2000 | Fly | 269/293 |
| 6,757,954 | B2 * | 7/2004 | Sei | 29/412 |
| 7,125,011 | B2 * | 10/2006 | McLaughlin | 269/289 R |
| 7,185,435 | B1 * | 3/2007 | Tseng | 30/152 |
| 7,264,542 | B1 * | 9/2007 | Leyva | 451/494 |
| 7,647,654 | B2 * | 1/2010 | Shamroth | 4/631 |
| 7,681,871 | B2 * | 3/2010 | Shew et al. | 269/289 R |
| 7,820,005 | B2 * | 10/2010 | Jensen et al. | 156/295 |
| 2001/0022419 | A1 * | 9/2001 | Herren | 269/289 R |
| 2002/0149148 | A1 * | 10/2002 | Chen | 269/289 R |
| 2004/0119221 | A1 * | 6/2004 | Davis | 269/289 R |
| 2006/0012097 | A1 * | 1/2006 | Wernette | 269/289 R |
| 2006/0087067 | A1 * | 4/2006 | Shamoon | 269/289 R |
| 2006/0208410 | A1 * | 9/2006 | McRorie, III | 269/289 R |
| 2007/0283575 | A1 * | 12/2007 | Hix et al. | 30/294 |
| 2011/0031672 | A1 * | 2/2011 | Phillips et al. | 269/289 R |

FOREIGN PATENT DOCUMENTS

FR    2646766 A1 * 11/1990

* cited by examiner

*Primary Examiner* — George Nguyen
(74) *Attorney, Agent, or Firm* — Leonard Taylor, Esq.

(57) ABSTRACT

The apparatus according to the present invention relates generally to a cutting board that can be used during food preparation. In particular the present invention relates to multi-layered cutting boards which are used for the preparation of food that are constructed to prevent bacterial contamination build-up between each stacked cutting layer of the cutting board. Prevention of bacterial contamination is achieved by sealing the perimeter surface of the cutting board using any method of sealing such as laser, heat and chemical processes. Sealing advantageously eliminates seams, crevices and gaps that naturally occur between stacked layers of the cutting board.

19 Claims, 5 Drawing Sheets

CUTTING BOARD APPARATUS

BACKGROUND OF THE INVENTION

1. Field of the Invention

The present invention relates generally to an apparatus that can be used during food preparation. In particular the present invention relates to multi-layered cutting boards that minimize bacterial contamination build-up, and are used in the preparation of food.

2. Description of Related Art

Cutting boards are generally fabricated from either wood or polyethylene. A well known cutting board is formed from a solid piece of material having two sides. Often each side of the cutting board can be used as a cutting surface.

During the process of food preparation maintaining sanitary conditions is of critical importance. This can be difficult when using conventional cutting boards which by their very nature are subject to nicks, gouges and knife blade indentations. Nicks, gouges and knife blade indentations are critical areas where bacteria can impregnate a cutting board surface, and eventually contaminate any food product that comes in contact with the cutting board surface. One way to circumvent this problem is by sanding the worn cutting surface to create a new unworn surface. This process is both time consuming and cumbersome. Additionally the sanding process results in a porous surface that is easily impregnated and contaminated with bacteria.

Another solution would be to construct cutting boards having multiple cutting surface layers adhered to one another. The multiple cutting surface layers provide consistent level surfaces onto which food products can be chopped, cut and diced. Multiple layer cutting boards require some sort of maintenance that includes removing the worn cutting board surface to eliminate any accumulated nicks, gouges and knife indentations. Removing used layers also advantageously diminishes the risk of bacterial contamination since any cutting surface nicks, gouges and knife blade indentations will be removed when the worn surface layer is removed. Reducing the risk of bacterial contamination stands at the top of the priority list for food sanitarians and health inspectors.

Prior art multi-layer cutting boards are prone to bacterial contamination. In the prior art as each layer is placed one upon another, a seam, crevice or a gap is formed in between the perimeter surfaces of the stacked layers. Bacteria can easily collect within the seam, crevice or gap resulting in contamination.

Another problem with existing multi-layered cutting board construction is that the corners of the cutting board's perimeter surfaces are squared off. Thus when adhesive is placed in between the layers of a squared off cutting board, the squared off edges tend to separate since the adhesive does not cover the squared off area efficiently. Additionally the squared off edges are prone to knocks and other impacts that can also cause the layers to separate.

A further problem with existing multi-layered cutting boards is the cutting board's inability to be placed into a commercial dishwasher without causing the layers to separate. This is due to the heat of the water within the dishwasher. Commercial dishwasher water can reach temperatures exceeding 180 degrees Fahrenheit.

Therefore there is not only a need for a cutting board that has removable multiple cutting surface layers but also for one that includes features that provide a cost effective and efficient method to keep the cutting board layers intact, that rejuvenate the cutting board surface and that eliminate bacterial prone seams, crevices, gaps and pockets between the layers.

SUMMARY OF THE INVENTION

An apparatus according to present invention comprises a multi-layered cutting board having peel off cutting layers, the cutting layers being stacked and affixed to each other with an adhesive such that the cutting layers can later be removed from one another. The apparatus further comprises sealing the cutting layers together on the cutting layers' perimeter surfaces using a manufacturing sealing method such as a laser, heat or chemical process whereby no seams, crevices and gaps are exposed between each stacked cutting layer. In another embodiment according to the present invention the apparatus further comprises a layer separator to assist with the separation of the peel off layers. In an embodiment according to the present invention the multi-layered cutting board comprises a plurality of layers stacked and adhered to each other, each layer being constructed of material such as anti-microbial polyethylene, anti-microbial polypropylene, anti-microbial rubber, anti-microbial plastic, anti-microbial composite rubber but other materials can be used. Each layer is affixed to each subsequent layer by an adhesive, preferably a food grade adhesive approved by the Food and Drug Administration, and Hazard Analysis and Critical Control Point compliant. A current exposed cutting surface layer can be separated from the next subsequent layer by peeling off the current exposed cutting surface layer from the next subsequent layer. In another embodiment according to the present invention the cutting board is sealed around its perimeter surface thus eliminating any seams, crevices and gaps that may occur as each layer is stacked on top of one another. To peel off a worn-out surface, a cutting board separator is used to score, penetrate or break the seal covering the seam, crevice or gap such that the seam, crevice or gap is exposed. In another embodiment according to the present invention the cutting board further comprises a cutting board handle formed into each layer of the cutting board such that when the cutting board layers are placed upon each other the handle extends perpendicularly through the entire cutting board. Multi-layered cutting boards advantageously provide a much greater return on investment, increasing cutting board life as much as 3 times on average. Each layer is constructed to be thin enough to peel and as such, even when removed, minimally decreases total thickness of the cutting board thereby retaining the integrity of the cutting board itself. When sealed, multi-layered cutting boards according to the present invention, have been tested to withstand layer separation when placed in temperatures exceeding 180 degrees Fahrenheit, which is the maximum temperature reached only by commercial dishwashers with a commercial dishwasher booster.

Health inspections for commercial eating and food preparation establishments are common, rigorous, and becoming ever more important. Health inspectors may give high marks for utilization of the cutting board assemblies disclosed herein, or even recommend their usage.

An aspect of the present invention comprises constructing a multi-layered cutting board from materials such as anti-microbial polyethylene, anti-microbial polypropylene, anti-microbial rubber, anti-microbial plastic, and anti-microbial composite rubber whereby the stacked cutting layers are connected to one another by a food grade adhesive and further sealed to each other at their perimeter surface such that any seams, crevices and gaps present between each stacked layer of the cutting board are eliminated.

Another aspect of the present invention comprises using a layer separator to score, penetrate and break the seal between each stacked layer whereby the seam, crevice or gap between each stacked layer is exposed, this advantageously facilitates removal of the worn layer. Another aspect of the present invention further comprises a handle that is built into a form of the cutting board such that when a top cutting layer is prepared for removal, the handle formed into the cutting board can be grabbed whereby the top cutting layer will easily peel away from the next cutting layer that it is adhered to. Another advantage of the handle is that it can be used to carry the cutting board from location to location.

Another aspect of the present invention further comprises constructing a multilayered cutting board from colored material such as anti-microbial polyethylene, anti-microbial polypropylene, anti-microbial rubber, anti-microbial plastic, and anti-microbial composite rubber, such that each color corresponds to a particular food grouping such as red for raw meat, brown for cooked meat, green for produce, yellow for poultry and blue for seafood however other color combinations can be used.

Another aspect of the present invention further comprises constructing a multi-layered cutting board such that the corners of the cutting board are rounded whereby an adhesive between stacked cutting layers more effectively affixes the layers together by eliminating any weak adhesion areas present in a squared-off corner. The weak adhesion area can be further exacerbated in normal routine use by bumping, knocking, and dishwashing. Additionally an insufficient amount of adhesive coverage can cause air to permeate squared-off corners which in turn causes the layers to separate. In another embodiment according to the present invention the perimeter surface of the multilayer cutting board is sealed thereby eliminating seams, crevices and gaps between each of the cutting layers on the cutting board's perimeter surface and making the adhesive affixing the cutting layers together more effective.

Another aspect of the present invention further comprises constructing a multi-layered cutting board such that the cutting board can be used as part of a workstation such as a cutting table. A table frame can be constructed in a manner that the multi-layered cutting board would be used as a removable table top of the table frame preferably by affixing the cutting board to the frame using a series of attachment devices such as a clamp. In another embodiment according to the present invention, the cutting board would be inserted into a receiving end of the table frame having an L-shaped inside perimeter such that the cutting board would be held in position by the protrusion of the L-shaped perimeter.

Another aspect of the present invention comprises a multi-layered cutting board that is sealed on the outside perimeter surface further including a layer separator whereby the layer separator comprises a blade capable of rotation embedded into a handle of the layer separator at a position at which the blade aligns with a location of a sealed seam, crevice or gap that exists between a top cutting layer to be removed and a next subsequent cutting layer adhesively stacked beneath it. When the layer separator is positioned against the sealed perimeter surface of the cutting board the blade of the layer separator is aligned with a sealed seam, crevice, or gap that exists between a top layer of the cutting board being removed and a next layer. During operation the blade of the layer separator will be used to score, penetrate and break the seal between the outermost layer to be removed and the next subsequent layer to facilitate outer layer removal.

The term "approximately" as used within this application means a variation of 0.001% to 5%.

The above and yet other aspects and advantages of the present invention will become apparent from the hereinafter set forth Brief Description of the Drawings and Detailed Description of the Invention.

BRIEF DESCRIPTION OF THE DRAWINGS

Apparatus that are particular embodiments of the invention will now be described, by way of example, with reference to the accompanying diagrammatic drawings.

DETAILED DESCRIPTION OF THE INVENTION

The present invention is directed to a multi-layered cutting board assembly wherein individual layers can be removed from the assembly and discarded as their cutting surfaces become damaged or exhausted. The disclosed cutting board assemblies include a plurality of material layers stacked and removably adhered to one another. Each of the plurality of layers generally has opposed planar surfaces. An overall thickness of the cutting board assembly is defined by the combined thicknesses of the plurality of material layers. At least one of the opposed surfaces on each of the material layers defines a potential cutting surface. Each of the plurality of material layers is sequentially removable beginning with an outermost layer from the cutting board assembly to expose fresh potential cutting surfaces on a next cutting layer. Depending on the particular embodiment of the cutting board assembly, a fresh potential cutting board surface may be any exposed planar surface of the remaining cutting board assembly.

Figure 1:
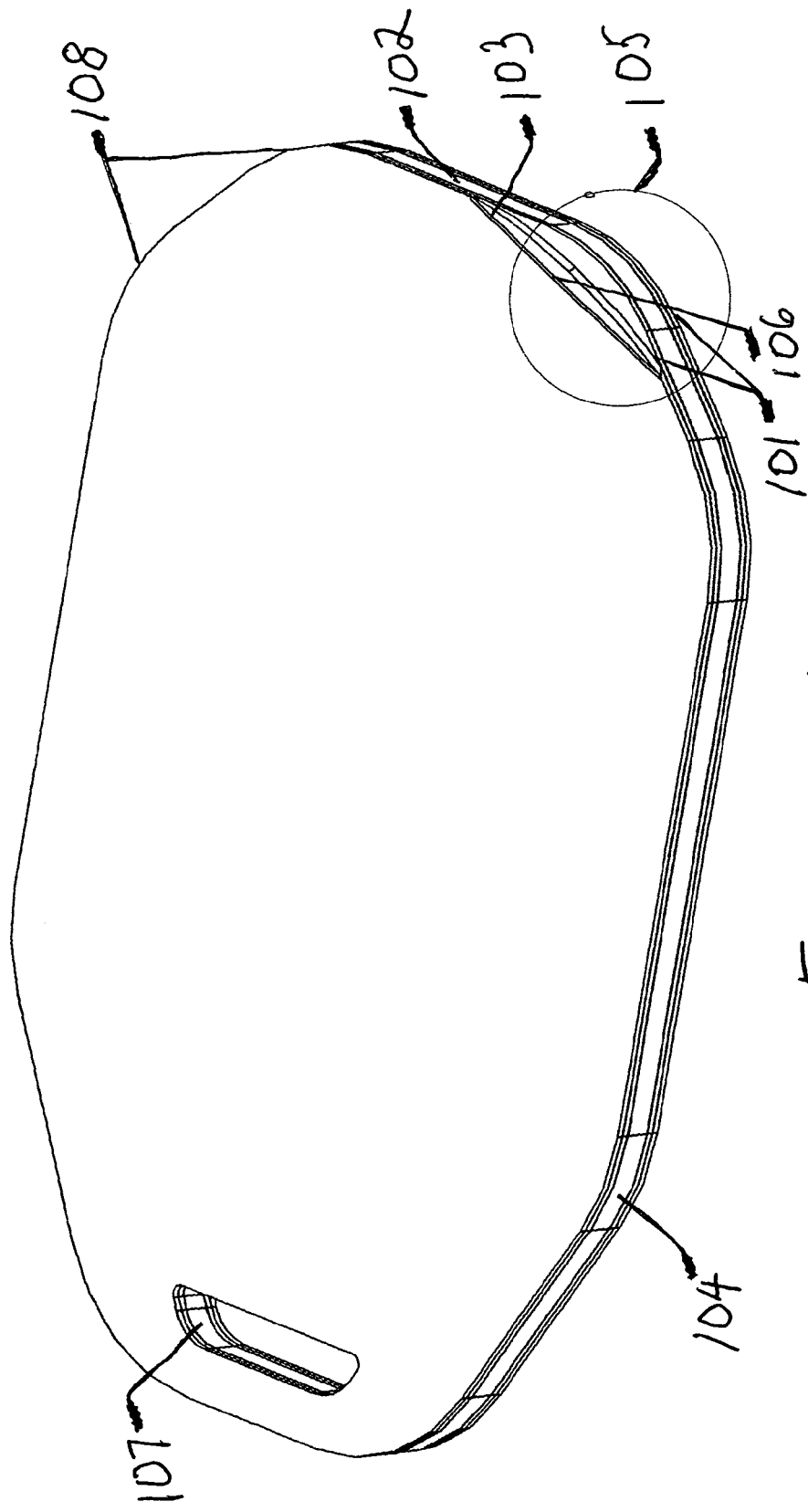
FIG. 1 illustrates a sealed multi-layered cutting board apparatus having a handle and an exposed unsealed cross section according to an embodiment of the present invention.

Referring to FIG. 1 which illustrates a multi-layered cutting board apparatus according to present invention comprising a plurality of layers 101 stacked and removably adhered to a substrate layer 102 preferably by using a food grade adhesive (not shown) approved by the Food and Drug Administration, and Hazard Analysis and Critical Control Point compliant, whereby a cutting layer 103 is removably affixed to a subsequent layer of the plurality of layers 101 and each of the subsequent plurality of layers 101 is removably affixed to each adjacent layer which is removably affixed to the substrate layer 102 whereby a stack of removable layers is created upon the substrate layer 102 as shown in a cross section 105 of the multi-layered cutting board. The perimeter surface of the multi-layered cutting board is sealed 104 on its entire surface using any standard heat, laser, chemical or other sealing methods such that there are no exposed seams, crevices and gaps 106 between any two adjacent layers inclusive of the substrate 102. Sealing the perimeter surface of the cutting board advantageously eliminates any exposed seams, crevices, and gaps 106 between the layers 101 and substrate 102 thereby preventing food particles from becoming lodged between the layers 101 and substrate 102 which thwarts the growth of bacteria. A further advantage is that by sealing the cutting board, the cutting board can be placed into a dishwasher without fear of layer separation due to hot moisture seepage into the seams, crevices and gaps 106 during the dishwashing process.

Another embodiment according to the present invention further comprises a handle 107 being formed into the multi-layered cutting board whereby the handle 107 can be used to transport the cutting board from location to location and since the handle 107 is formed into each layer of the multi-layered cutting board, the handle 107 can be further used to facilitate removal of each worn layer that is to be discarded.

Another embodiment according to the present invention further comprises a plurality of rounded edges 108 formed on the perimeter surface of the multi-layered cutting board whereby the plurality of rounded edges 108 facilitate the effectiveness of the adhesive used to affix each adjacent layer to the substrate and to each other. By rounding or curving the perimeter surface edges of the cutting board to eliminate angled or squared-off edges, premature separation of an outermost cutting layer from a next adjacent layer is advantageously prevented due to the cutting board being less exposed to bumps and knocks that can cause premature separation of the outermost cutting layer from the next subsequent layer as well as the common problem of the adhesive not totally covering an entire section of an angled corner between each adjacent layer.

Figure 2:
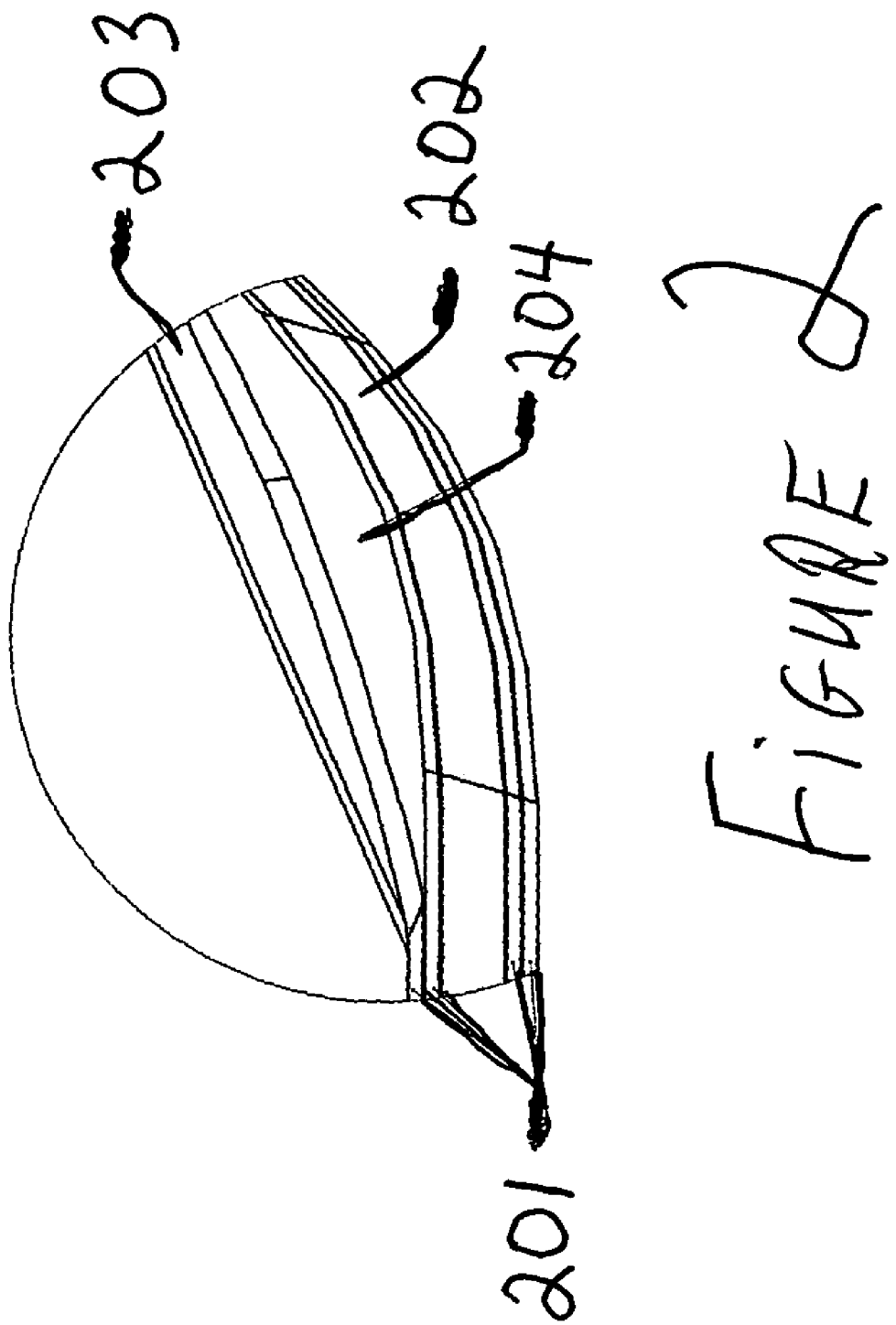
FIG. 2 illustrates a cross section of an unsealed area of a multi-layered cutting board apparatus according to an embodiment of the present invention.

FIG. 2 illustrates a cross section of an unsealed portion of a multi-layered cutting board according to an embodiment of the present invention. A plurality of layers 201 are removably affixed to each other using a food grade adhesive. The plurality of layers is further affixed to a substrate layer 202 which provides support and rigidity to the cutting board. However according to another embodiment of the present invention the cutting board can be constructed without a substrate layer 202. During usage an outermost layer 203 of the cutting board is used for food preparation. The outermost cutting layer can be on either side of the cutting board. Seams, crevices and gaps 204 exist between each layer of the cutting board inclusive of the substrate layer. An advantage of the within invention is that the seams, crevices and gaps 204 that occur along the perimeter surface of the cutting board are eliminated during the sealing process thereby reducing bacterial contamination due to food particles becoming lodged in the seams, crevices and gaps 204 when the cutting board is used.

Figure 3:
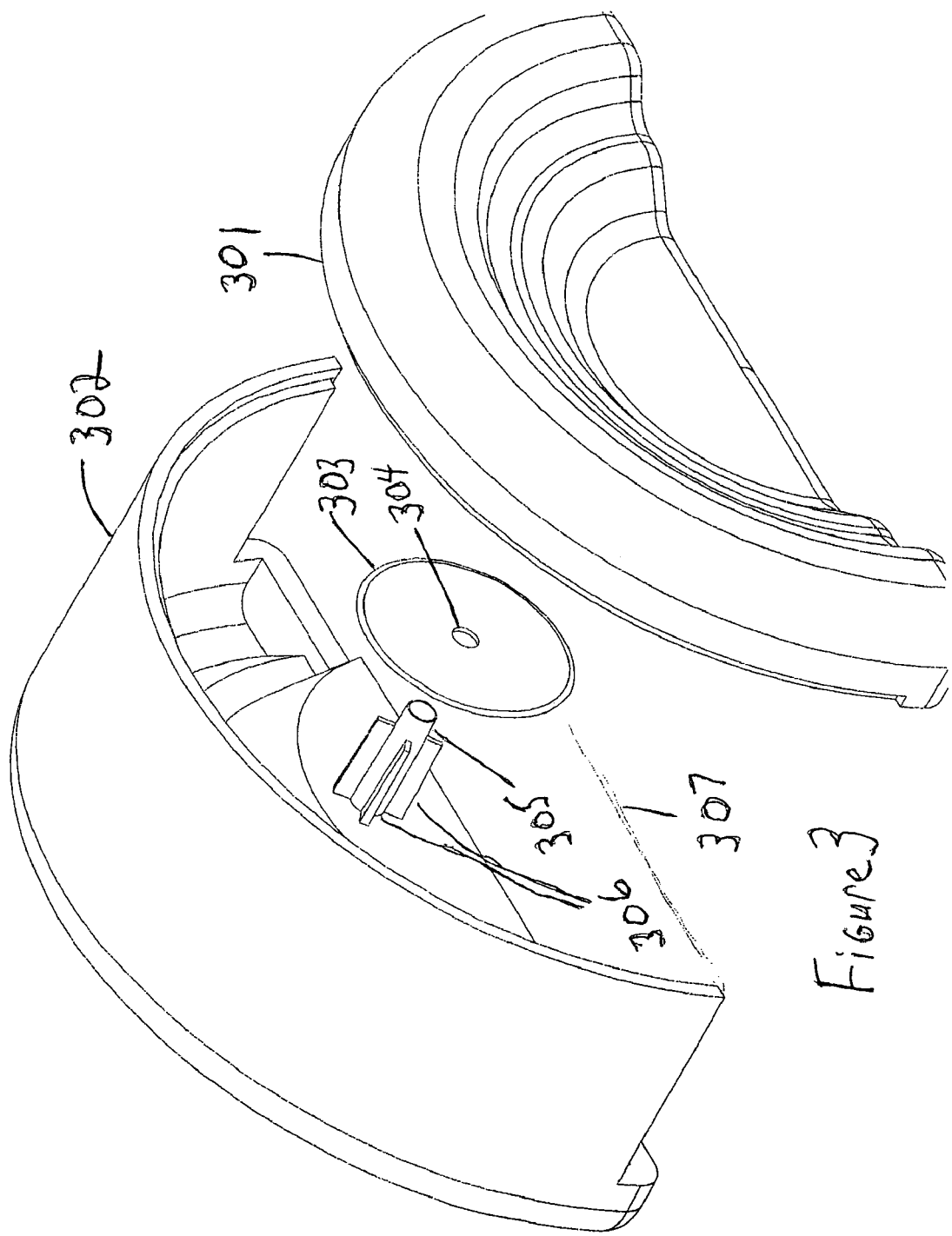
FIG. 3 illustrates a layer separator according to an embodiment of the present invention.

FIG. 3 illustrates a layer separator according to an embodiment of the present invention. Since the multi-layered cutting board is sealed along its perimeter surface to prevent food particles from becoming lodged between each layer thereby eliminating a risk of bacterial contamination, a layer separator is provided whereby the layer separator can be used to score, penetrate or pierce the seal enclosing a seam, crevice or gap to facilitate the removal of a worn out layer. The layer separator comprises a first housing portion 301, and a second housing portion 302 that is constructed such that the first housing portion 301 can fit onto the second housing portion 302 whereby a layer separator is formed. The second housing portion further comprises a blade 303 having a blade post receiver 304 and a blade post 305 having blade supports 306 which inserts into the blade post receiver 304 such that the blade 303 is held into position by the blade supports 306 and can freely rotate relative to the blade post 305. It should be noted that a circular blade 303 is illustrated but other shaped blades can be used such as an octagon, hexagon, star shape or any other shape for example a straight edge blade. Furthermore the blade can have a smooth edge or a serrated edge. Additionally the blade can also be fixed instead of rotatable.

Upon completed assembly of the layer separator, the blade 303 protrudes and extends beyond a planar edge 307 of the second housing portion 302. During operation the planar edge 307 will be in direct contact with the multi-layered cutting board.

The point at which the blade 303 extends out from the planar edge 307 of the layer separator is at a position that is approximately aligned with a sealed seam, crevice or gap that exists between an outermost layer of the multi-layered cutting board and a next adjacent cutting board layer or substrate. Since the thickness of each removable layer of the multi-layered cutting board is known, the distance between the protruded blade and the first housing portion 301 is set to be approximately equal to the thickness of the layer to be removed thereby causing the blade 303 to align with a sealed seam, crevice or gap that occurs between the outermost layer of the cutting board and its next subsequent layer.

Figure 4:
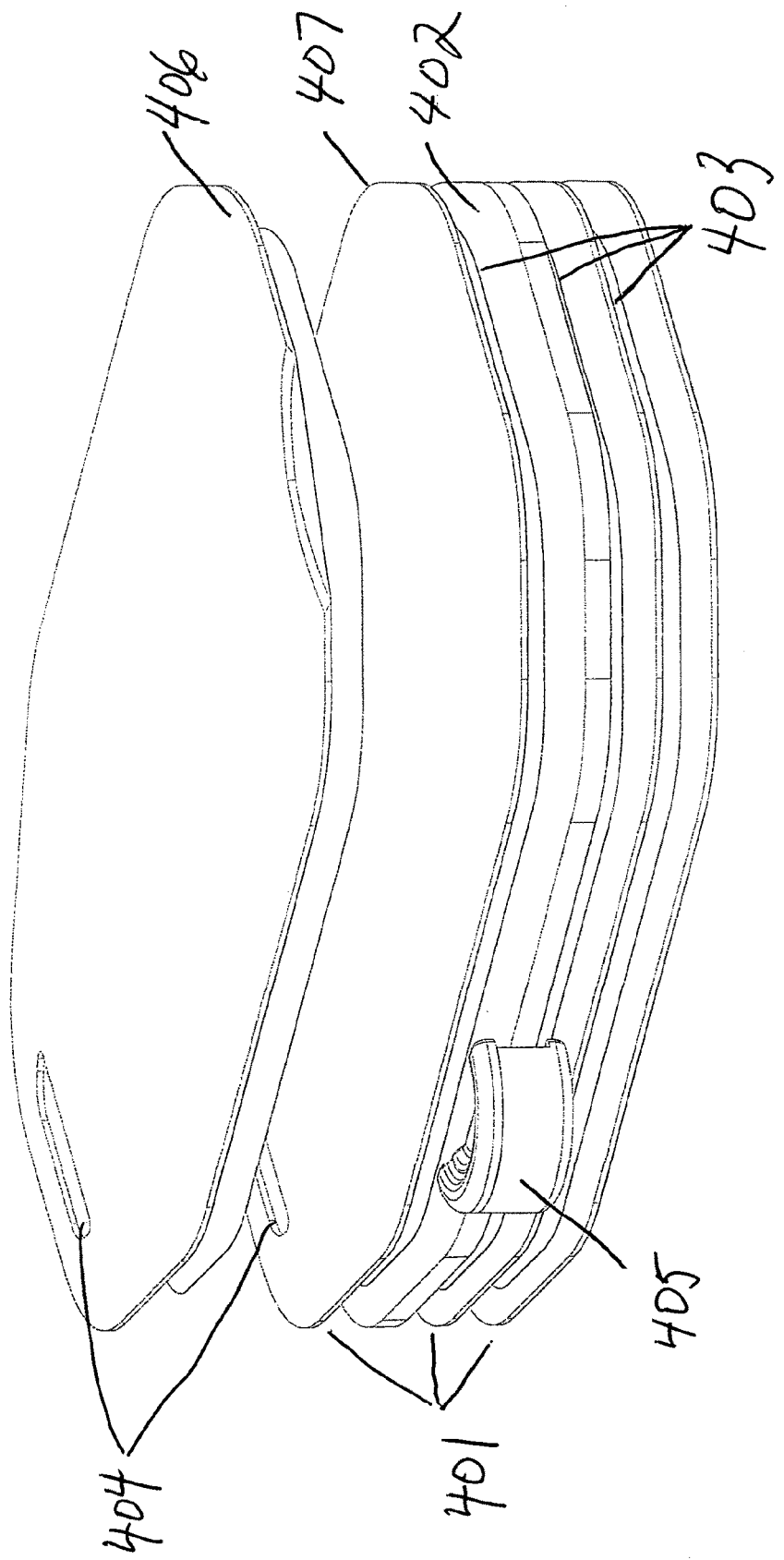
FIG. 4 illustrates a multi-layered cutting board having a layer separator according to an embodiment of the present invention.

FIG. 4 illustrates a multi-layered cutting board having a handle and layer separator according to an embodiment of the present invention.

The cutting board comprises a plurality of layers 401 that are removably stacked and adhered to each other and a substrate 402 upon which the plurality of layers 401 is adhered to. Each of the plurality of layers 401 is adhered to each other and the substrate 402 preferably by using a food grade adhesive 403 approved by the Food and Drug Administration, and Hazard Analysis and Critical Control Point compliant. Each layer of the plurality of layers 401 and the substrate 402 has a handle 404 formed into it such that when the multi-layered cutting board is completely assembled, the handle 404 will extend through the entire cutting board assembly. Additionally the inside perimeter surface of the handle is also sealed to eliminate seams, crevices and gaps to prevent bacterial contamination between the plurality of layers 401 and the substrate 402. An advantage of having the handle 404 formed into every layer of the cutting board is that during removal of a worn out layer, the handle 404 can be grasped by a user to facilitate removal of the worn out layer. A further advantage of the handle 404 is that it enables the cutting board to be easily carried.

In another embodiment according to the present invention, the multi-layered cutting board preferably has a sealed perimeter surface as described with reference to FIG. 1 above, such that no seams, crevices and gaps that may exist between each layer of the cutting board are exposed. The multi-layered cutting board perimeter surface can be sealed in a variety of ways including by heat, laser, chemical, glue or epoxy. The sealed perimeter surface seams advantageously prevent bacterial build-up between cutting board layers.

During removal of a worn out layer, a layer separator 405 is positioned against the multi-layered cutting board 401 such that the layer separator's blade as described above in reference to FIG. 3, is positioned to approximately align with a sealed seam that occurs between an outermost layer 403 of the cutting board and its next subsequent layer 404 or substrate 402. The blade of the layer separator 405 is then used to score, penetrate or break the seal that covers the perimeter surface seam, crevice or gap. Once the seal is scored, penetrated or broken and the perimeter surface seam, crevice or gap is exposed, the outermost layer 406 can be easily peeled off from the next useable layer 407 or substrate 402 preferably by pulling the handle 404 of the outermost layer 406 that is to be discarded.

Figure 5:
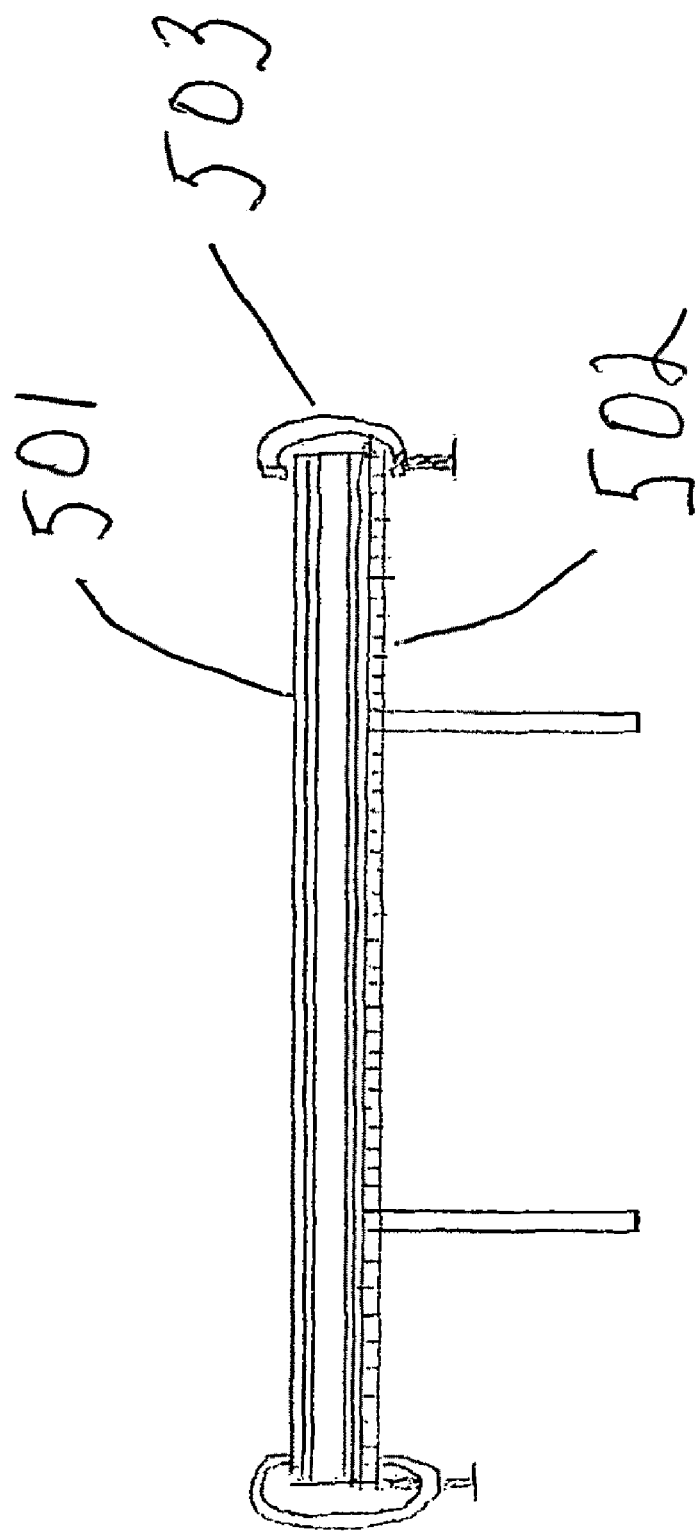
FIG. 5 illustrates a multi-layered cutting board in the form of a cutting table top according to an embodiment of the present invention.

FIG. 5 illustrates a multi-layered cutting board in the form of a cutting table top according to an embodiment of the present invention.

A multi-layered cutting board 501 is constructed such that the multi-layered cutting board 501 can fit into or on top of a cutting table 502. According to an embodiment of the present invention the multi-layered cutting-board 501 is attached to the cutting table 502 preferably by using clamps 503 however other attachment means can be used such as screws, nails, and clips. In another embodiment according to the present invention the top of the cutting table 502 is constructed to have a L-shaped perimeter lip (not shown), the inside dimensions and shape of the L-shaped perimeter lip are approximately equal to the outside dimensions and shape of the cutting board. The L-shaped perimeter lip will accommodate receiving and supporting the multi-layered cutting board 501 when the cutting board 501 is positioned to fit within the perimeter lip of the cutting table 502. Preferably when inserting the cutting board into the L-shaped perimeter lip of the cutting table, the multi-layered cutting board is positioned to be recessed into the top of the cutting table and held into position and supported by the L-shaped perimeter lip.

Having described embodiments for a multi-layered cutting board apparatus, it is noted that modifications and variations can be made by persons skilled in the art in light of the above teachings. It is therefore to be understood that changes may be made in the particular embodiments of the invention disclosed which are within the scope and spirit of the invention as defined by the appended claims.

What is claimed is:

1. A cutting board apparatus comprising:
    a plurality of material layers of approximately equal size and shape, stacked and removably adhered to one another such that each outermost layer comprises at least one exposed surface defining a potential cutting surface whereby when each outermost layer is removed from a next subsequent layer a fresh potential cutting surface is uncovered;
    a sanitary seal enclosing a perimeter surface of the stacked plurality of material layers such that no external seams, gaps and crevices are exposed between each of the plurality of material layers; and
    a layer separator having a cutting blade whereby when the layer separator is positioned against the sealed perimeter surface of the plurality of material layers, the cutting blade is approximately aligned with an outermost sealed seam, crevice or gap that is present between the outermost layer and the next subsequent layer of the plurality of material layers, wherein the layer separator further comprises a first housing section, a second housing section having a blade post, the blade post further having a plurality of blade supports, a scoring blade having a blade post receiver that adaptively fits onto the blade post such that when assembled the blade can rotate perpendicular to the blade post and the plurality of blade supports keeps the blade approximately aligned with an outermost sealed seam, crevice or gap that exists between the outermost layer of the plurality of material layers and a next subsequent layer of the plurality of material layers.

2. The cutting board apparatus according to claim 1, wherein the sanitary seal is comprised of at least one of a heat formed seal, a laser formed seal, an antimicrobial sealant, a sealant, an antimicrobial glue, a glue, an anti-microbial shrink-wrapped seal, a shrink wrapped seal, an anti-microbial chemical seal, a chemical seal, an anti-microbial rubber seal and a rubber seal.

3. The cutting board apparatus according to claim 1 wherein the plurality of material layers comprises at least one of anti-microbial polyethylene, anti-microbial polypropylene, anti-microbial rubber, anti-microbial plastic, and anti-microbial composite rubber.

4. The cutting board apparatus according to claim 1, wherein the plurality of material layers includes at least one substrate layer having a thickness that is greater than each of the remaining plurality of material layers which are equal in thickness to one another, whereby the remaining plurality of material layers are adhered to the at least one substrate layer, on either a top planar side, a bottom planar side, or both planar sides of the at least one substrate layer.

5. The cutting board apparatus according to claim 1, further comprising a layer removal handle formed into each of the plurality of material layers.

6. The cutting board apparatus according to claim 5, wherein the sanitary seal further encloses an inside perimeter surface of the layer removal handle such that all seams, crevices and gaps are sealed.

7. The cutting board apparatus according to claim 1, wherein the plurality of material layers further comprises a perimeter surface having rounded edges.

8. The cutting board apparatus according to claim 1, wherein the scoring blade is at least one of a circular shaped blade, a circular shaped blade having a straight cutting edge, a circular shaped blade having a plurality of saw toothed cutting edges, a circular shaped blade having a serrated cutting edge, a movable straight-edged blade and a fixed non-movable straight-edge blade.

9. A cutting board apparatus according to claim 1, wherein the cutting board apparatus has an exposed potential cutting surface on an outermost layer on each planar side of the cutting board apparatus.

10. A cutting board apparatus according to claim 1, wherein the plurality of material layers are adhered to one another by an adhesive applied on each planar surface of each material layer that directly contacts another material layer of the plurality of material layers.

11. A method comprising the steps of:
    Stacking and adhering a plurality of removable material layers upon each other to form a multi-layered cutting board;
    Sealing a perimeter surface of the stacked and adhered plurality of removable material layers such that there are no exposed seams, crevices and gaps between each of the plurality of removable material layers; and
    using a layer separator having a cutting blade whereby when the layer separator is positioned against the sealed perimeter surface of the plurality of material layers, the cutting blade is approximately aligned with an outermost sealed seam, crevice or gap that is present between the outermost layer and the next subsequent layer of the plurality of material layers, wherein the layer separator further comprises a first housing section, a second housing section having a blade post, the blade post further having a plurality of blade supports, a scoring blade having a blade post receiver that adaptively fits onto the blade post such that when assembled the blade can rotate perpendicular to the blade post and the plurality of blade supports keeps the blade approximately aligned with an outermost sealed seam, crevice or gap that exists between the outermost layer of the plurality of material layers and a next subsequent layer of the plurality of material layers to score, penetrate and break the sealed seam, crevice or gap that exists between an outermost layer of the plurality of removable material layers and its next subsequent layer.

12. The method of claim 11 further comprising the step of forming a handle in each of the plurality of removable material layers such that when the plurality of removable material layers are stacked upon one another the handles of each of the plurality of material removable layers approximately align with each other to form a handle that extends perpendicularly through an entire multi-layered cutting board planar surface.

13. The method of claim 11 wherein the step of sealing a perimeter surface of the stacked and adhered plurality of removable material layers includes sealing a perimeter surface of the stacked and adhered plurality of removable material layers using at least one of heat, laser, chemicals, epoxy, sealants and glue.

14. The method of claim 11 wherein the plurality of removable material layers includes material layers comprising at least one of anti-microbial polyethylene, anti-microbial polypropylene, anti-microbial rubber, anti-microbial plastic, and anti-microbial composite rubber.

15. The method of claim 11 further comprising the step of using a cutting board table having an open table top having an L-shaped support track with a perimeter and shape that is approximately equal to an outside perimeter and shape of the stacked and adhered plurality of removable material layers such that the plurality of removable material layers can be inserted and recessed into the open table top, being held in place and supported by the L-shaped support track.

16. The method of claim 11 wherein the scoring blade is at least one of a circular shaped blade, a circular shaped blade having a straight cutting edge, a circular shaped blade having a plurality of saw toothed cutting edges, a circular shaped blade having a serrated cutting edge, a movable straight-edged blade and a fixed non-movable straight-edge blade.

17. An apparatus comprising:
  a plurality of material layers stacked and adhered to one another such that each outermost layer comprises at least one exposed surface defining a potential cutting surface whereby when each outermost layer is removed from a next subsequent layer a fresh potential cutting surface is uncovered;
  a sanitary seal enclosing a perimeter surface of the stacked plurality of material layers such that no external seam, crevice or gap is present between each of the plurality of material layers;
  a cutting board holding table constructed such that the cutting board holding table can receive and support the stacked and adhered plurality of material layers in a manner preventing the plurality of material layers from movement while cutting; and
  a layer separator having a cutting blade whereby when the layer separator is positioned against the sealed perimeter surface of the plurality of material layers, the cutting blade is approximately aligned with an outermost sealed seam, crevice or gap that is present between the outermost layer and the next subsequent layer of the plurality of material layers, wherein the layer separator further comprises a first housing section, a second housing section having a blade post, the blade post further having a plurality of blade supports, a scoring blade having a blade post receiver that adaptively fits onto the blade post such that when assembled the blade can rotate perpendicular to the blade post and the plurality of blade supports keeps the blade approximately aligned with an outermost sealed seam, crevice or gap that exists between the outermost layer of the plurality of material layers and a next subsequent layer of the plurality of material layers, to score, penetrate and break the sealed seam, crevice or gap that exists between an outermost layer of the plurality of removable material layers and its next subsequent layer.

18. The apparatus of claim 17 further comprising at least one clamping device wherein when the plurality of material layers is placed onto the cutting board holding table, the at least one clamping device secures the plurality of material layers to the cutting board table.

19. The apparatus of claim 17 wherein the scoring blade is at least one of a circular shaped blade, a circular shaped blade having a straight cutting edge, a circular shaped blade having a plurality of saw toothed cutting edges, a circular shaped blade having a serrated cutting edge, a movable straight-edged blade and a fixed non-movable straight-edge blade.

\* \* \* \* \*